United States Patent
Heydt et al.

(10) Patent No.: US 6,772,749 B2
(45) Date of Patent: Aug. 10, 2004

(54) BAND SAW

(75) Inventors: Fritz Heydt, Nürtingen (DE); Manfred Ihle, Bühlertal (DE)

(73) Assignee: Keuro Besitz GmbH & Co. EDV-Dienstleistungs KG, Achern (DE)

( * ) Notice: Subject to any disclaimer, the term of this patent is extended or adjusted under 35 U.S.C. 154(b) by 0 days.

(21) Appl. No.: 10/225,635

(22) Filed: Aug. 22, 2002

(65) Prior Publication Data

US 2003/0062035 A1 Apr. 3, 2003

(30) Foreign Application Priority Data

Aug. 23, 2001 (DE) .......................................... 101 41 404

(51) Int. Cl.⁷ ................................................. B28D 1/04
(52) U.S. Cl. ........................ 125/13.03; 125/12; 125/14; 125/16.04; 125/21; 83/788; 83/794; 83/795; 83/796; 83/797; 83/789; 83/798; 83/801; 83/809; 83/810
(58) Field of Search ............................... 125/12, 13.03, 125/14, 16.04, 21; 83/788, 794, 795, 796, 797, 789, 801, 798, 809, 810

(56) References Cited

U.S. PATENT DOCUMENTS

| | | | |
|---|---|---|---|
| 2,162,848 A | | 6/1939 | Kulp |
| 4,342,241 A | * | 8/1982 | Eklund .......................... 83/56 |
| 4,766,790 A | | 8/1988 | Harris |
| 4,899,720 A | | 2/1990 | Chiri et al. |
| 5,191,824 A | * | 3/1993 | Rathbun, Jr. .................. 83/874 |
| 5,320,016 A | * | 6/1994 | Spath et al. ................... 83/801 |

FOREIGN PATENT DOCUMENTS

| | | |
|---|---|---|
| DE | 3502880 | 1/1986 |
| DE | 3710515 A1 | 6/1988 |
| DE | 68903494 T2 | 6/1993 |
| EP | 0399076 A1 | 11/1990 |
| FR | 8308743 | 12/1983 |
| FR | 2619328 | 7/1989 |
| JP | 60016318 | 10/1985 |
| JP | 61236420 | 10/1986 |
| JP | 01078718 | 3/1989 |
| WO | WO9802273 | 1/1998 |

* cited by examiner

*Primary Examiner*—Joseph J. Hail, III
*Assistant Examiner*—Shantese McDonald
(74) *Attorney, Agent, or Firm*—Volpe & Koenig, P.C.

(57) ABSTRACT

A band saw with a complex coordination of a tilting motion and a translational motion between the workpiece and the band saw blade, so that a curved cut is made in the workpiece. The geometric parameters of the cut can be continuously adjusted. This makes it possible to optimize a contact length of the saw blade in the workpiece, which is an important factor in the cutting process. It is thus possible to saw workpieces made of stone and similar materials that are typically difficult to cut. The cut and the contact length of the saw blade can be tailored individually to each workpiece to be sawed. Thus, workpieces of different geometrical dimensions and different material properties, in particular with different material hardnesses, can be processed using the band saw according to the invention without having to undertake significant changes.

12 Claims, 5 Drawing Sheets

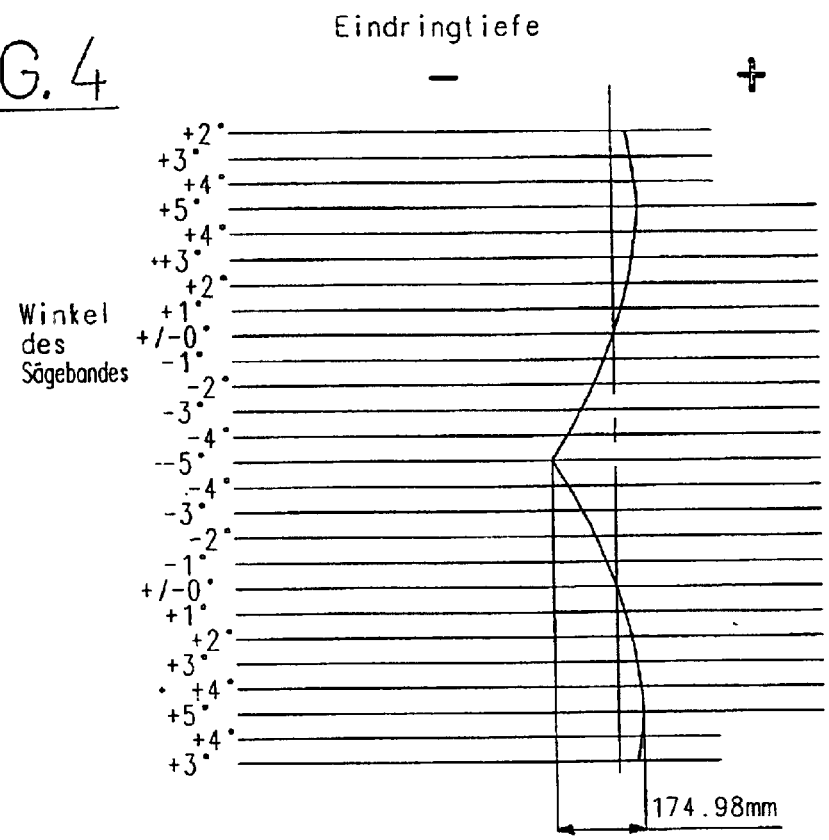
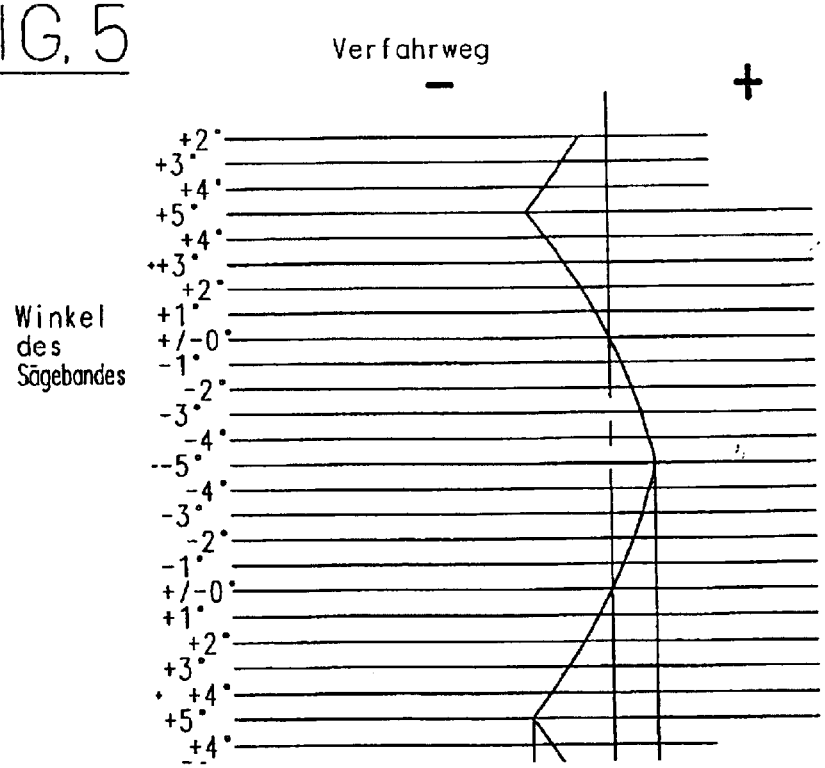

BAND SAW

BACKGROUND

This invention pertains to a band saw, in particular for workpieces made of rock and similar materials that are difficult to cut, with a workpiece table on which at least one workpiece can be fixed, and a tool support for a continuous band saw blade.

Band saws can be used to saw various types of materials. For a large percentage of materials to be sawed, the types of band saws used are those in which a continuous saw blade penetrates into a workpiece by an advancing motion. Thereby, a straight cut arises in the workpiece.

When sawing workpieces made of stone and similar materials that are difficult to cut, these common band saws have been proven to be unsuitable since the contact length of the band saw blade in the workpiece and the resultant forces are too great.

In order to reduce the contact length of the band saw blade, the purely translational motion made by the saw blade with respect to the workpiece must be combined with a tilt motion. This produces a curved, in particular arc-shaped cut in the workpiece.

In DE 31 02 766, a metal sawing machine is described which is used to cut through a workpiece as it produces a rocking motion of the saw blade. In this application the machine is a horizontal band saw, by which an arc-shaped cut can be produced while maintaining a constant contact length in the workpiece. The arc-shaped cut is thereby permanently prescribed in its geometric dimensions. The curved fixed pattern is generated by two geometric formed parts, called cams. These cams must be manufactured in an expensive manner according to the desired cut in the workpiece. It is thus not possible to vary the geometric parameters of the arc-shaped cut without having to expend a considerable amount of effort to manufacture special geometric formed parts. With the fixed pattern of the cut, the contact length in the workpiece is also automatically fixed. Thus it is not possible to adjust the contact length of the band saw blade to the geometric dimensions of the workpiece, the hardness of the material of the workpieces, i.e. the material quality of the workpiece, much less optimize it.

SUMMARY

The object of this invention is to provide a band saw that makes it possible to saw materials, in particular workpieces made of stone that are difficult to cut. This band saw is intended to be used for workpieces of different geometric dimensions and different material properties, in particular different material hardnesses. The band saw according to the invention is characterized by a high cutting capacity, simple handling and cost effective production. Furthermore, it is fast and flexible to use, without having to make significant changes to it.

This object is met according to the invention in that the workpiece and the band saw blade make translational motions and tilting motions relative to one another about an axis perpendicular to the cutting plane. These motions are coordinated with one another such that a crooked cut arises in the workpiece with the geometric parameters of the cut being continuously varied.

According to the invention the band saw can be provided with different setups. In general, the workpiece is fixed and the saw makes the translational motions and tilting motions about an axis perpendicular to the cutting plane. This is frequently advantageous when the workpiece is an especially heavy and large one.

On the other hand, it is, in principal, also possible for the tool support holding the band saw blade to be fixed, and the translational motions and the tilting motions are made by the workpiece table which holds the workpiece. This could prove to be advantageous if the tool support and the band saw are especially heavy and unwieldy.

A third possibility of relative movement between band saw blade and workpiece with respect to one another is to split up the translational motion and the tilting motion. It would be posssible, for example, for the workpiece to make the tilt motion in this case and the band saw blade to make the translational motion, or vice versa.

In the band saw according to the invention, band saw blade and workpiece can be arranged differently with respect to one another. Thus, for example, the device can be provided as a horizontal band saw or a vertical band saw.

In the band saw according to the invention, the translational motions and the tilting motions are coordinated between workpiece and band saw blade. An especially favorable embodiment of the band saw is to coordinate the motion sequences using an electronic control system. To this end, for example, the desired motion sequences can be calculated using a PC, the control signals can then be issued from it to corresponding servomotors to execute the motion sequences. In this manner, it is possible to arbitrarily coordinate the motion sequences with respect to one another.

The translational motions are composed of motion sequences of the band saw blade relative to the workpiece that are into and away from the workpiece. During the sawing process, therefore, an approach and withdrawal of the band saw blade with respect to the workpiece takes place in an alternating fashion in the translational motion sequence. These motions are exactly coordinated with the tilt motion.

An advancing motion in the direction toward the workpiece can be superimposed onto the translational forward and backward motions of the band saw blade relative to the workpiece during the sawing process. These advancing motions can be implemented in various ways. For one thing, it possible that a continuous advancing motion is superimposed onto the translational and tilt motion sequences during the entire sawing process. Furthermore, it is also conceivable for the advancing motion, i.e. the approach between workpiece and band saw blade, to occur discontinuously during the sawing process. In this case, the approach of workpiece and band saw blade occurs in shifts. In other words, workpiece and band saw blade first approach one another in one advancing motion, then the combination sawing process including translational and tilting motions occurs, after which another shift approach between the band saw blade and workpiece takes place.

Depending on whether a continuous advancing motion or a discontinuous advancing motion is combined with the translational and tilting motions, the outline of the cutting path changes.

The cut that results in the workpiece that arises during the process, i.e. the edge of the cutting plane on the material, has a crooked shape in the band saw according to the invention. Depending on how the motion sequences, i.e. translational motion, tilt motion and advancing motion, are combined with one another, the cut is made in the workpiece accordingly. The crooked cut can, for example be in the shape of an arc. In individual cases, it may be especially favorable to have an arc of a circle cut result from the sawing process. To produce a circular cut, it has proven advantageous if the tilt axis lies at approximately half the height (for a vertical band saw) or at approximately half the width (for a horizontal band saw) of the workpiece, i.e. approximately near its line of symmetry.

By combining translational and tilting motions, the contact length of the band saw blade, i.e. the point of contact of the band saw blade, can be tailored to the workpiece for the sawing process. In general, the contact length of the band saw blade remains nearly constant in the workpiece during the sawing process. For special requirements it is possible to vary the contact length during the cutting process. This can then be an advantage if the material to be sawed is inhomogeneous, i.e. has areas of differing properties such as different material hardnesses.

In the limiting case, the contact length of the band saw blade can be just a single point on the workpiece.

There are many criteria according to which the coordination of the motion sequences is set up to produce a desired curved cut and to select the optimal contact length of the band saw blade in the workpiece. For one thing, the geometric dimensions of the workpiece, i.e. the height, width and depth as well as the external contour of the workpiece must be taken into account. Furthermore, a very important factor is the material properties of the material to be sawed. In this regard, the material hardness plays a particularly important role.

BRIEF DESCRIPTION OF THE DRAWINGS

Further features and advantages of this invention can be found in the description of a preferred embodiment with the help of the drawings Shown are:

FIG. 4 is a diagram showing the penetration depth of the tool into the material to be sawed as a function of the angular position, measured at the workpiece platform;

FIG. 5 is a diagram of the translational travel of the linear drives between the individual angular positions;

DETAILED DESCRIPTION OF THE PREFERRED EMBODIMENTS

Figure 1:
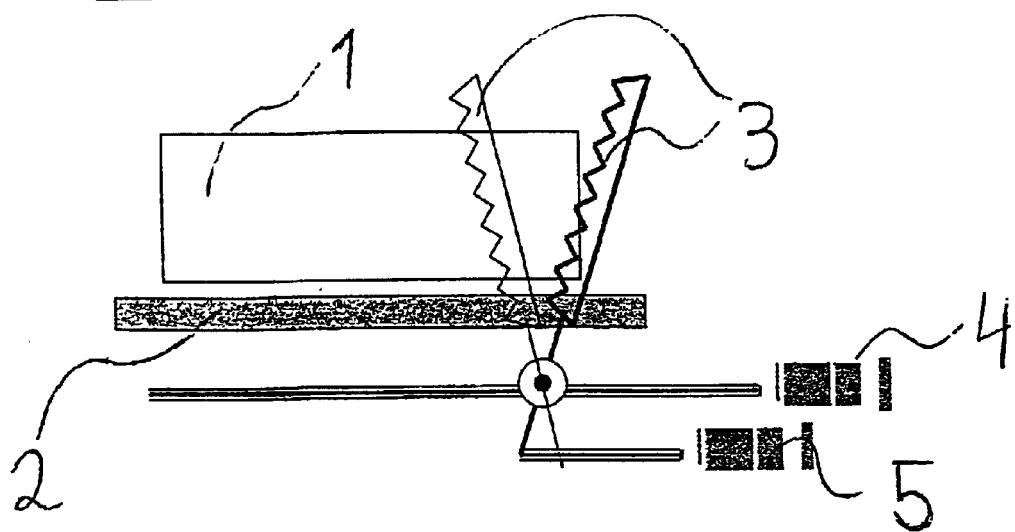
FIG. 1 is a schematic side view of the band saw according to the invention.

The setup of a band saw according to the invention is shown schematically in FIG. 1. The workpiece 1 to be sawed is not moved in the embodiment shown. It lies on a workpiece platform 2 to which it can also be fastened if necessary. The band saw (partially shown) is a vertical band saw in which the translational motions and the tilting motions as well as the advancing motion are made by the saw blade 3 only. The saw blade 3 is a continuous saw blade that is held in a tool support (not shown here). The translational motions of the band saw blade relative to the workpiece and the advancing motion of the band saw blade toward the workpiece are done using a linear drive 4. The linear drive can, for example, be designed as a chain drive. To produce the tilting motions of the band saw blade, a tilt drive 5 is used. This can be, for example, an electro-actuated cylinder.

To produce the desired curved cut and the desired contact length, the motion sequences by the linear drive 4 and tilt drive 5 must be coordinated with one another.

Figure 2:
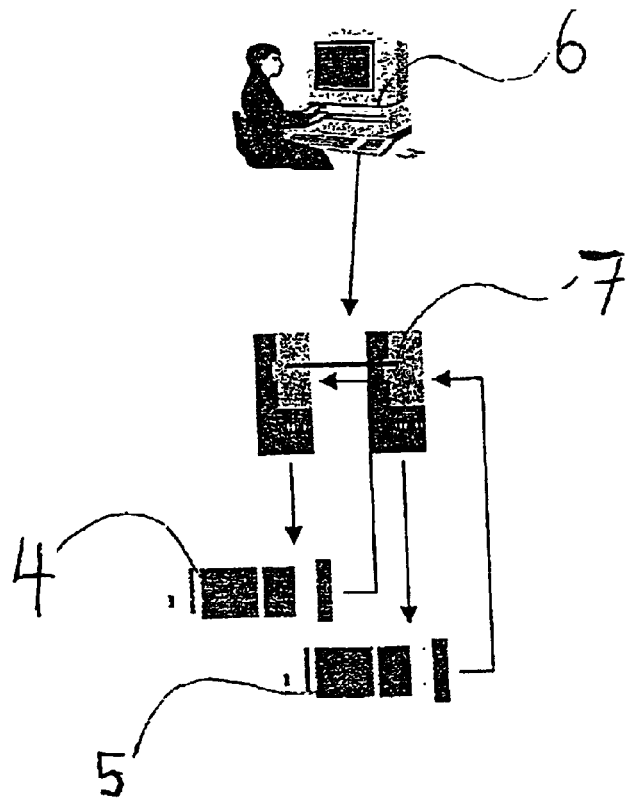
FIG. 2 is a schematic drawing showing the electronic control of the band saw.

In FIG. 2, the setup for controlling the two drive systems 4 and 5 is shown schematically. The associated parameters relevant to the sawing process are input to a PC 6. This data is then forwarded to the frequency converter 7. In the frequency converter 7, the mathematical function that controls the two drives 4 and 5 is calculated using the data transferred from the PC 6. Corresponding signals are then forwarded to the drive systems 4 and 5 from the frequency converter 7. To coordinate the two drive systems 4 and 5, these systems send feed back signals to the frequency converter 7. The frequency converter 7 is thus responsible for the coordination (the axis coupling) of the two drives 4 and 5. The drive systems are continuously regulated.

The data input to the PC includes the geometric dimensions of the workpiece, the cutting speed, the advancing speed, the tilt speed, etc.

Figure 3:
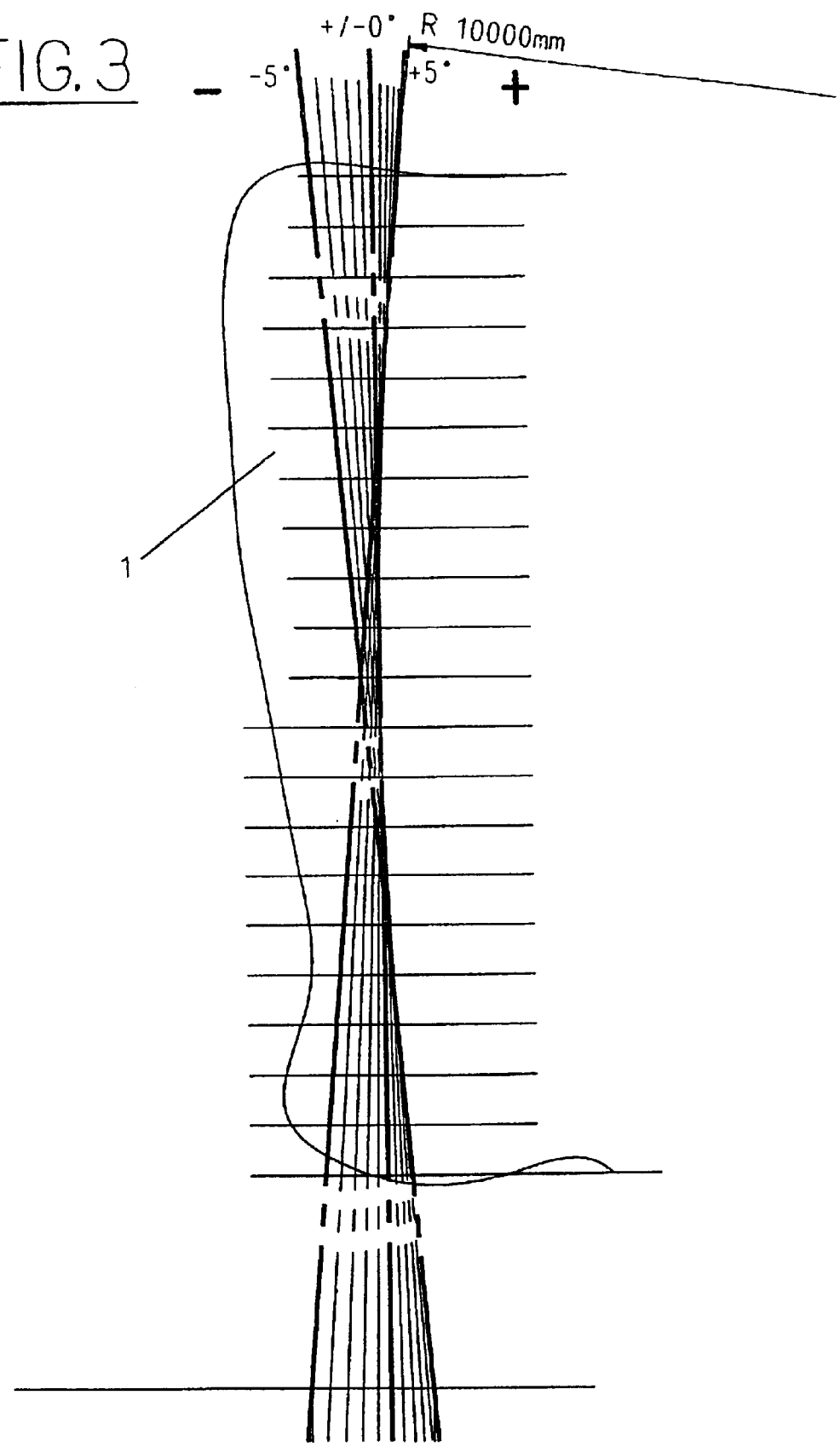
FIG. 3 is a diagram showing the positions of the saw blade in 1° steps from −5° to +5°

In FIG. 3, the different saw blade positions are shown in steps of a single degree from −5° to +5° in the workpiece. In the embodiment shown, the blade contact length is approximately 300 mm. The arc that results as a round cut has a radius of approximately 10,000 mm, for example. Shown on the ruled line beneath the workpiece are the positions of the guide rollers of the linear drive at each angle. The linear path is dependent on the cutting height. For example, the maximum linear path at a tilting angle of 10° and 2,000 mm cutting height=248.47 mm.

At the upper edge of the workpiece, the saw blade penetrates the deepest into the workpiece at a tilt angle of +5°. As the tilt angle decreases, the penetration depth of the saw blade into the upper edge of the workpiece continuously decreases and reaches its minimum at a tilt angle of −5°.

In FIG. 4, this penetration depth of the tool into the material to be sawed is shown at the upper edge of the workpiece as a function of the angular positions. In this plot, one can see that at an angle of +5°, the saw blade penetrates into the workpiece the deepest at the upper edge and the penetration depth into the workpiece decreases with decreasing angle. At a tilt angle of 0°, the penetration depth into the workpiece is also 0 mm. As the tilt angle continues to decrease, the saw blade then increasingly pulls out of the workpiece away from the upper edge of the workpiece. As seen in FIG. 4, the penetration depth decreases continuously. It reaches its minimum at a tilt angle of −5°. As the tilt angle increases, the penetration depth then increases continuously at the top of the material and again reaches its maximum at a tilt angle of +5°. Within a cycle from −5° to +5°, a path of 174.88 mm is traversed by the saw blade at the upper edge of the workpiece at a cutting height of 2,000 mm and an adjusted circular radius of 10,000 mm.

In FIG. 5, the translational travel of the band saw blade is shown for the different angular positions of the saw blade. The band saw blade has the largest linear distance from the workpiece at a tilt angle of +5°. As the tilt angle of the band saw blade decreases, the linear distance of the saw blade from the workpiece continuously decreases. At a tilt angle of 0°, the linear translational travel of the saw blade is 0 mm. As the tilt angle continues to decrease, the translational travel of the saw blade continuously increases and reaches its maximum at a tilt angle of −5°. As the tilt angle increases from there, the translational travel of the saw blade then again continuously decreases and reaches its minimum at a tilt angle of +5°. The translational travel traversed during a tilt angle cycle from −5° to +5° is 248.47 mm in the embodiment shown at a cutting height of 2,000 mm and a circular radius of 10,000 mm.

Figure 6:
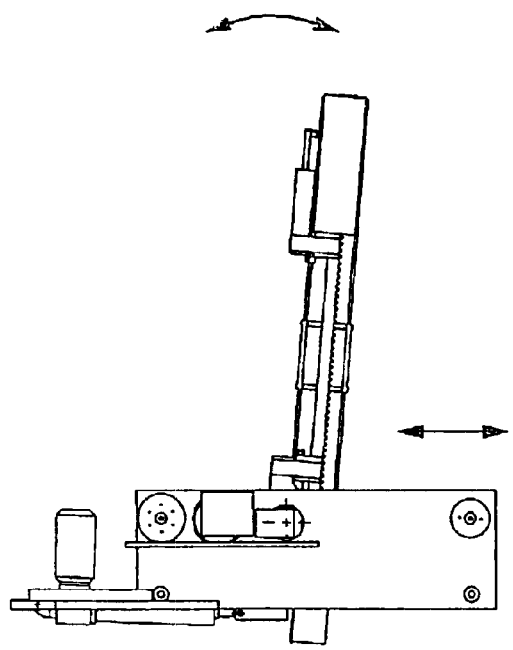
FIGS. 6–10 are elevational views of the band saw at various tilt positions of the saw blade from +5° (FIG. 6), −2.5° (FIG. 7), +/−0° (FIG. 8), −2.5° (FIG. 9) up to −5° (FIG. 10)
Figure 7:
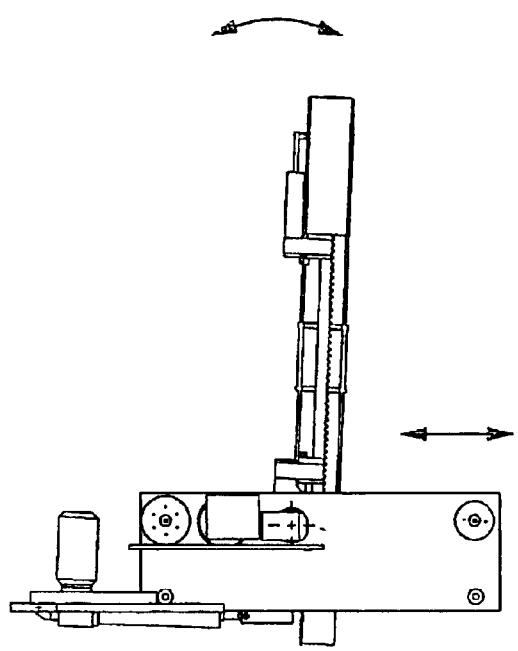
Figure 8:
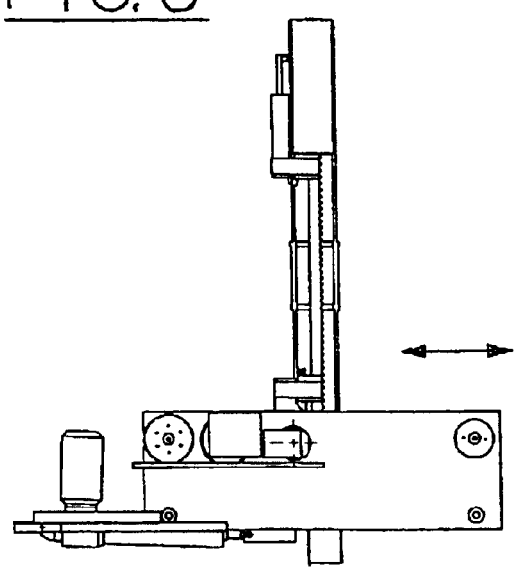
Figure 9:
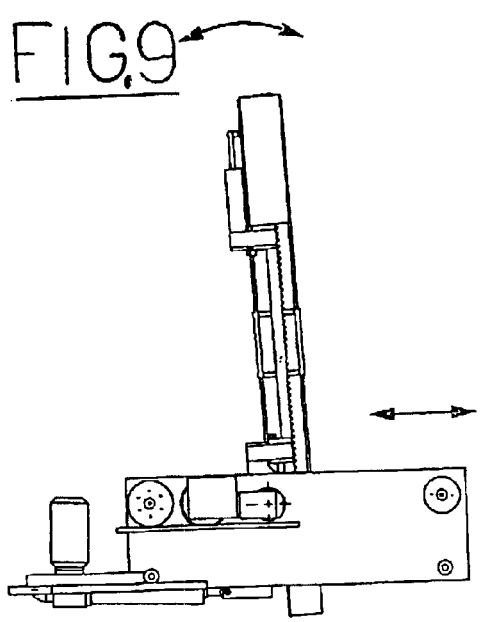
Figure 10:
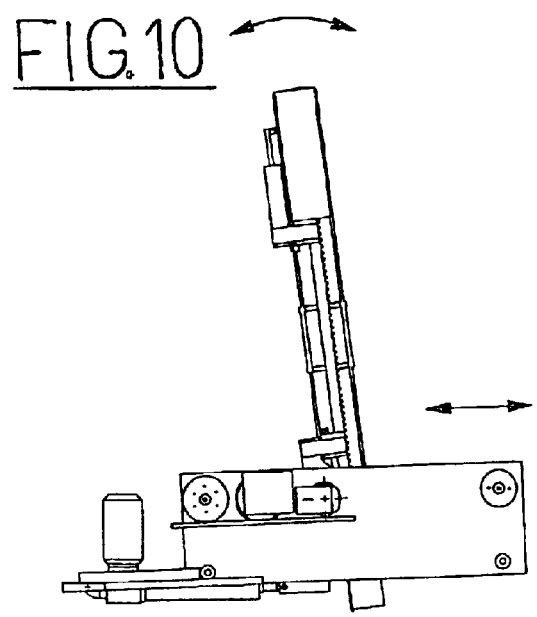

In the embodiment shown, the advancing motion of the saw blade is made discontinuously. It takes place only at the two reversing points of the tilt angle, i.e. at −5° and at +5°. After the advancing motion is made, the cooperation of translational motion and tilt motion restarts in order to implement the arc-shaped cut. In the example shown, the translational motion that is made by the linear drive was coordinated with the tilt motion that is made by the tilt drive. This means that the tilt drive executes a motion similar to a sine function between +5° and −5° and the motion of the linear drive then is coordinated with this with the purpose of producing the desired cut in the workpiece. In FIGS. 6 through 10, the position of the saw blade is shown in graphic detail in its tool support at different tilt angles. The tilt angle in FIG. 6 is +5°, in FIG. 7 it is +2.5°, in FIG. 8 it is +/−0°, in FIG. 9 it is −2.5° and in FIG. 10 it is −5°.

What is claimed is:

1. A band saw for work pieces (1) made of stone and other materials, comprising a workpiece table (2) to which at least one workpiece (1) can be fixed, and a tool support for a continuous saw blade (3), the workpiece (1) and the saw blade (3) being supported for translational motions and tilting motions about an axis perpendicular to a cutting plane relative to one another, said motions being coordinated such that a crooked cut is made at a blade contact area in the workpiece as the workpiece is being cut, the crooked cut results in the blade contact area of the saw blade being less than a thickness of the material being engaged by the blade and defines a non-linear cutting path through the thickness of the material, with geometric parameters of the cutting path at the blade contact area being continuously variable.

2. The band saw according to claim 1, wherein the saw blade (3) makes translational motions and tilting motions about the axis perpendicular to the cutting plane relative to a fixed workpiece (1).

3. The band saw according to claim 1, wherein the saw blade is supported in a fixed position and the workpiece (1) is supported to make translational motions and tilting motions about the axis perpendicular to the cutting plane relative to the fixed continuous saw blade (3).

4. The band saw according to claim 1, wherein the coordination of the translational motions and the tilting motions is done through an electronic control system.

5. The band saw according to claim 1, wherein the translational motions are made up of motion sequences of the saw blade (3) relative to the workpiece (1) that are toward and away from the workpiece (1).

6. The band saw according to claim 1, wherein the band saw blade is supported for an advancing motion in the direction toward the workpiece (1) that is superimposed onto the translational motions of the saw blade (3) relative to the workpiece (1).

7. The band saw according to claim 1, wherein the translational motions and the tilting motions are coordinated such that an arc-shaped cut arises in the workpiece.

8. The band saw of claim 1, wherein the translational motions and the tilting motions are coordinated such that an arc of a circle cut arises in the workpiece.

9. The band saw according to claim 1, wherein the tilt axis is located at approximately half a height of the workpiece (1) for a vertical band saw or at approximately half a width of the workpiece (1) for a horizontal band saw.

10. The band saw according to claim 1, wherein the translational motions and the tilting motions are coordinated such that a contact length of the saw blade is nearly constant in the workpiece during the cutting process.

11. The band saw according to claim 1, wherein the translational motions and the tilting motions are coordinated such that a contact length of the saw blade (3) in the workpiece (1) is approximately a single point.

12. The band saw according to claim 1, wherein the translational motions and the tilting motions are coordinated such that a contact length and/or the cut can be tailored for workpieces (1) of differing geometrical dimensions and different material properties.

\* \* \* \* \*